(12) United States Patent
Mahajan et al.

(10) Patent No.: US 11,423,175 B1
(45) Date of Patent: Aug. 23, 2022

(54) SYSTEMS AND METHODS FOR PROTECTING USERS

(71) Applicant: Symantec Corporation, Mountain View, CA (US)

(72) Inventors: Anant Mahajan, Culver City, CA (US); SriHarsha Angara, Mountain View, CA (US)

(73) Assignee: NortonLifeLock Inc., Tempe, AZ (US)

( * ) Notice: Subject to any disclaimer, the term of this patent is extended or adjusted under 35 U.S.C. 154(b) by 249 days.

(21) Appl. No.: 16/526,514

(22) Filed: Jul. 30, 2019

(51) Int. Cl.
*G06F 21/62* (2013.01)
*G06T 5/00* (2006.01)

(52) U.S. Cl.
CPC ...... *G06F 21/6254* (2013.01); *G06F 21/6263* (2013.01); *G06T 5/002* (2013.01)

(58) Field of Classification Search
CPC .. G06F 21/6254; G06F 21/6263; G06T 5/002
See application file for complete search history.

(56) References Cited

U.S. PATENT DOCUMENTS

| | | | | |
|---|---|---|---|---|
| 9,977,921 B2 * | 5/2018 | Sprague | | G06F 21/00 |
| 2012/0331557 A1 * | 12/2012 | Washington | | G06Q 20/4016 |
| | | | | 726/26 |
| 2013/0125201 A1 * | 5/2013 | Sprague | | G06F 21/6263 |
| | | | | 726/1 |
| 2013/0305383 A1 * | 11/2013 | Garralda | | G06F 21/60 |
| | | | | 726/26 |
| 2014/0196152 A1 * | 7/2014 | Ur | | G06F 21/00 |
| | | | | 726/26 |
| 2016/0283450 A1 * | 9/2016 | Zhou | | H04N 1/4493 |
| 2018/0240216 A1 * | 8/2018 | Dirik | | G06K 9/00577 |
| 2019/0191300 A1 * | 6/2019 | Cahan | | G06F 21/60 |
| 2019/0354717 A1 * | 11/2019 | Boon | | H04L 9/0643 |
| 2020/0134795 A1 * | 4/2020 | Zhang | | G06F 12/0875 |
| 2022/0019695 A1 * | 1/2022 | Scotney | | H04L 63/0421 |

* cited by examiner

*Primary Examiner* — Cheng-Feng Huang
(74) *Attorney, Agent, or Firm* — FisherBroyles, LLP (57) ABSTRACT

The disclosed computer-implemented method for protecting users may include (i) detecting, by a privacy-protecting security application, an attempt by a user to upload an item of media content, (ii) determining, by the privacy-protecting security application, that the item of media content matches a true identity signature for the user that the privacy-protecting security application generated based on other items of media content relating to the user, and (iii) prompting, by the privacy-protecting security application in response to determining that the item of media content matches the true identity signature, the user to perform a privacy-protecting security action to prevent exposing a true identity for the user. Various other methods, systems, and computer-readable media are also disclosed.

20 Claims, 6 Drawing Sheets

SYSTEMS AND METHODS FOR PROTECTING USERS

BACKGROUND

In the modern information age, users interact with wide area networks, such as the Internet, on a routine and daily basis. Some of these users may interact with the Internet as part of their careers within a corporate work environment. Similarly, some of these users may interact with the Internet recreationally and personally, such as through a home personal computer.

As users increasingly rely upon the Internet, concerns about user privacy are becoming more and more prevalent. To address concerns about user privacy, sometimes users manage to interact with an Internet resource anonymously. In some specific situations, users may adopt an anonymous persona and use the anonymous persona to engage with an online resource, such as a user forum. Nevertheless, despite all of these attempts to protect the privacy of users interacting with the Internet, there may still sometimes occur situations where the privacy of users becomes compromised. Accordingly, the instant disclosure identifies and addresses a need for improved systems and methods for protecting users.

SUMMARY

As will be described in greater detail below, the present disclosure describes various systems and methods for protecting users. In one example, a computer-implemented method for protecting users may include (i) detecting, by a privacy-protecting security application, an attempt by a user to upload an item of media content, (ii) determining, by the privacy-protecting security application, that the item of media content matches a true identity signature for the user that the privacy-protecting security application generated based on other items of media content relating to the user, and (iii) prompting, by the privacy-protecting security application in response to determining that the item of media content matches the true identity signature, the user to perform a privacy-protecting security action to prevent exposing a true identity for the user.

In one embodiment, the item of media content may include an item of social media content. In one embodiment, the item of media content may include (i) text content, (ii) image content, (iii) audio content, and/or (iv) video content. In some examples, prompting the user to perform the privacy-protecting security action may include alerting the user to a geolocation tagging component that poses a risk of exposing the true identity for the user.

In some examples, prompting the user to perform the privacy-protecting security action may include prompting the user to perform (i) removing a portion of the item of media content corresponding to the true identity for the user and/or (ii) anonymizing the portion of the item of media content corresponding to the true identity for the user. In one embodiment, the item of media content includes image content and prompting the user to perform the privacy-protecting security action includes prompting the user to blur a portion of the image content. In one embodiment, the item of media content includes vocal content and prompting the user to perform the privacy-protecting security action includes prompting the user to add noise to a portion of the vocal content.

In one embodiment, the item of media content may include a telephone number and prompting the user to perform the privacy-protecting security action includes prompting the user to substitute the telephone number with an anonymized telephone number. In one embodiment, the privacy-protecting security application generates the true identity signature based on information that the user uploaded to an identity theft protection service. In one embodiment, the true identity signature for the user enables the privacy-protecting security application to detect a match for at least one of: (i) an image of the user, (ii) a voice of the user, (iii) a writing style of the user, and (iv) personally identifiable information of the user.

In one embodiment, a system for implementing the above-described method may include (i) a detection module, stored in memory, that detects, as part of a privacy-protecting security application, an attempt by a user to upload an item of media content, (ii) a determination module, stored in memory, that determines, as part of the privacy-protecting security application, that the item of media content matches a true identity signature for the user that the privacy-protecting security application generated based on other items of media content relating to the user, (iii) a prompting module, stored in memory, that prompts, as part of the privacy-protecting security application and in response to determining that the item of media content matches the true identity signature, the user to perform a privacy-protecting security action to prevent exposing a true identity for the user, and (iv) at least one physical processor configured to execute the detection module, the determination module, and the prompting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, by a privacy-protecting security application, an attempt by a user to upload an item of media content, (ii) determine, by the privacy-protecting security application, that the item of media content matches a true identity signature for the user that the privacy-protecting security application generated based on other items of media content relating to the user, and (iii) prompt, by the privacy-protecting security application in response to determining that the item of media content matches the true identity signature, the user to perform a privacy-protecting security action to prevent exposing a true identity for the user.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting users. The disclosed subject matter may improve upon related technology by dynamically enabling a user to prevent the unintended or accidental exposure of personally identifiable information, or the privacy-compromising information relating to the user's true identity. In some examples, the disclosed subject matter may improve upon related technology by streamlining, or making more convenient, the manner of extracting, generating, compiling, and/or building a true identity signature for the user, thereby eliminating a more tedious or inconvenient process of requesting that the user manually input one or more items of information relating to the user's true identity. Instead, the disclosed subject matter may dynamically and intelligently crawl through previously stored, or otherwise archived, items of social media content, or other content, relating to the user, and extract items of information relating to the user's true identity from these items of social media content, thereby enabling the disclosed system to conveniently and autonomously generate the corresponding true identity signature.

Furthermore, the disclosed subject matter may also improve upon related technology by increasing a degree and/or scope with which the privacy-protecting application monitors for, detects, and potentially prevents, the unintended or accidental exposure of personally identifiable information and related information. For example, even if some related systems perform these functions regarding standardized personally identifiable information, they may not necessarily do so for more dynamic and sophisticated items of privacy-compromising information, such as images of users and/or audio recordings of users, etc. These beneficial improvements of the disclosed subject matter are discussed in more detail in connection with the figures below.

Figure 1:
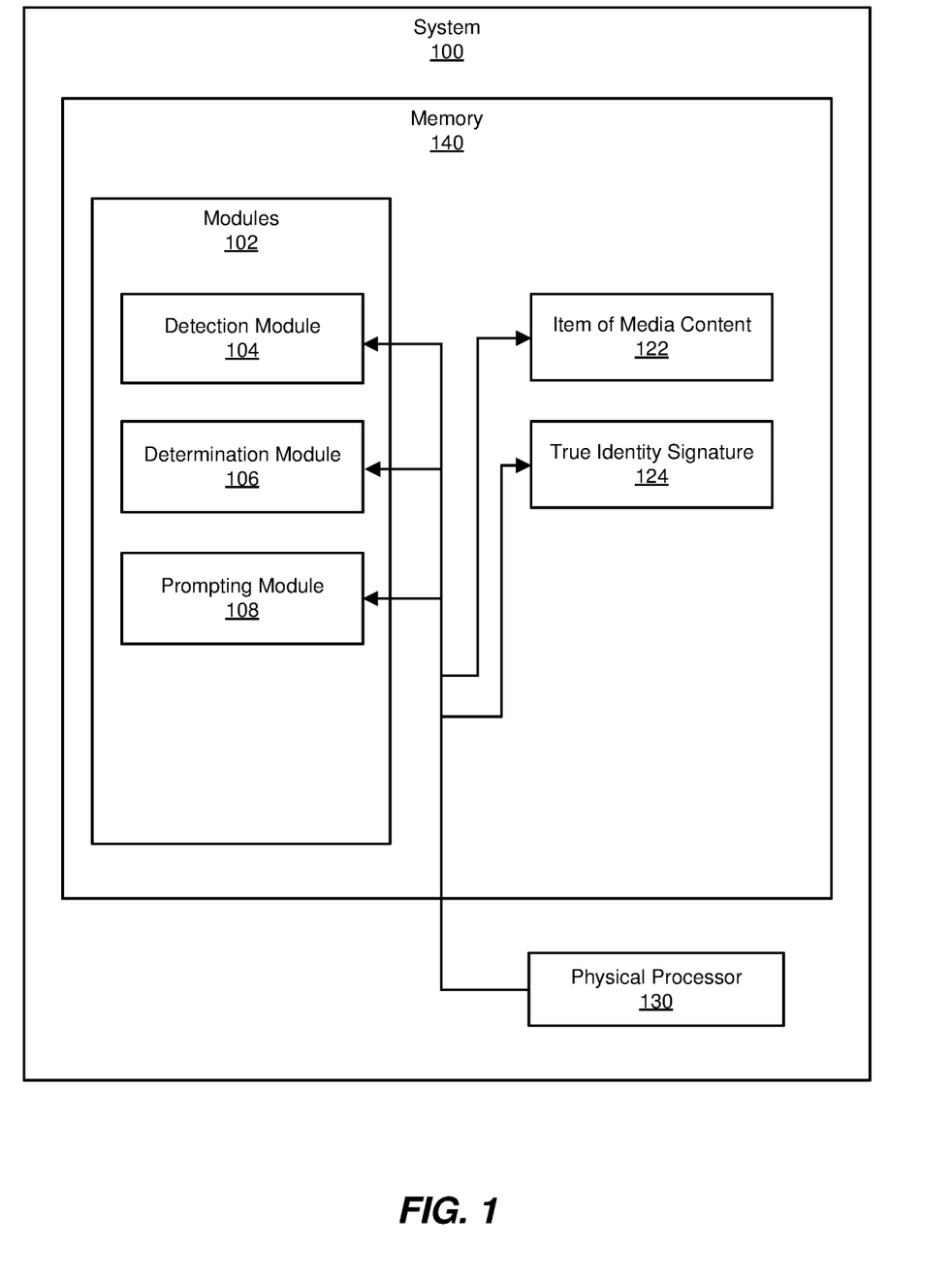
FIG. 1 is a block diagram of an example system for protecting users.
Figure 2:
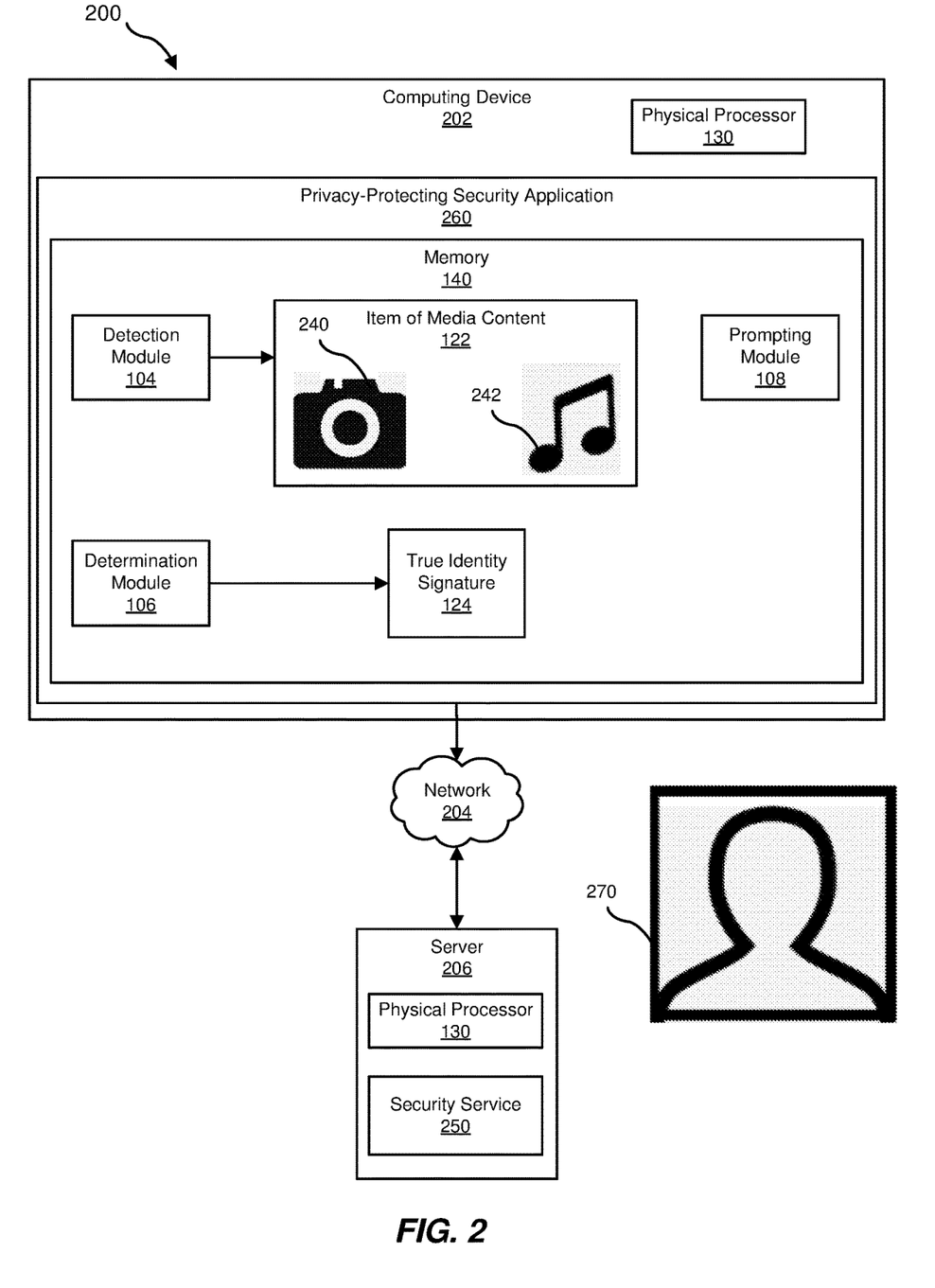
FIG. 2 is a block diagram of an additional example system for protecting users.

The following will provide, with reference to FIGS. 1-2, detailed descriptions of example systems for protecting users. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for protecting users. As illustrated in this figure, example system 100 may include one or more modules 102 for performing one or more tasks. For example, and as will be explained in greater detail below, example system 100 may include a detection module 104 that detects, as part of a privacy-protecting security application, an attempt by a user to upload an item of media content 122. Example system 100 may additionally include a determination module 106 that determines, as part of the privacy-protecting security application, that item of media content 122 matches a true identity signature 124 for the user that the privacy-protecting security application generated based on other items of media content relating to the user. Example system 100 may also include a prompting module 108 that prompts, as part of the privacy-protecting security application and in response to determining that item of media content 122 matches true identity signature 124, the user to perform a privacy-protecting security action to prevent exposing a true identity for the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect users.

For example, and as will be described in greater detail below, detection module 104 may detect, as part of a privacy-protecting security application 260, an attempt by a user 270 to upload item of media content 122. Item of media content 122 may optionally include an item of image content 240 or an item of audio content 242. Determination module 106 may determine, as part of privacy-protecting security application 260, that item of media content 122 matches true identity signature 124 for user 270 that privacy-protecting security application 260 generated based on other items of media content relating to user 270. Prompting module 108 may prompt, as part of privacy-protecting security application 260 and in response to determining that item of media content 122 matches true identity signature 124, user 270 to perform a privacy-protecting security action to prevent exposing a true identity for user 270.

Computing device 202 generally represents any type or form of computing device capable of reading computer-executable instructions. In some illustrative examples, computing device 202 may correspond to an end user client device for corporate work, personal, and/or recreational use. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300, as discussed in more detail below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
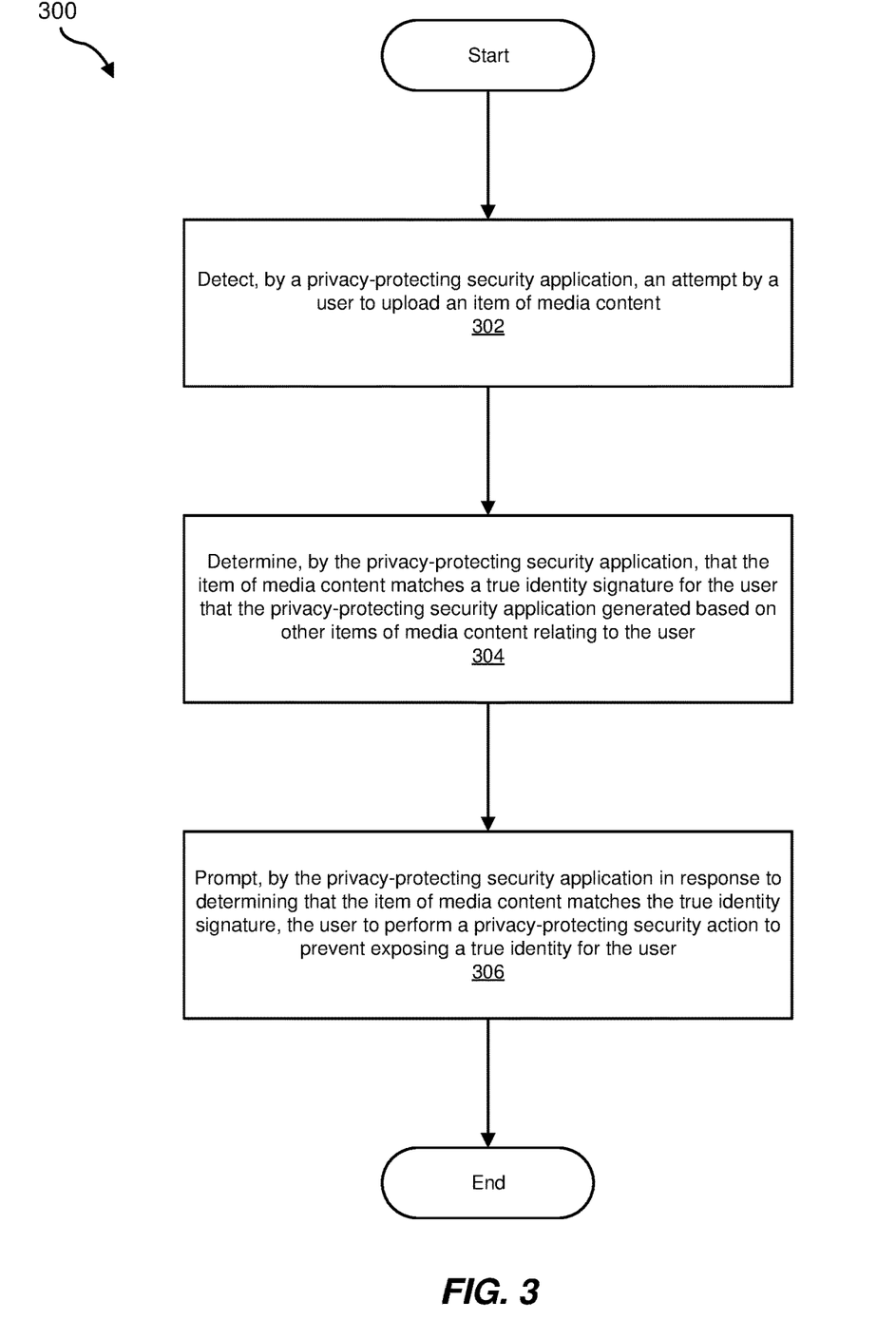
FIG. 3 is a flow diagram of an example method for protecting users.

FIG. 3 is a flow diagram of an example computer-implemented method 300 for protecting users. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, in connection with a privacy-protecting security application, an attempt by a user to upload an item of media content. For example, detection module 104 may, as part of privacy-protecting security application 260, detect an attempt by user 270 to upload an item of media content 122.

Detection module 104 may perform step 302 in a variety of ways. In some examples, detection module 104 may be disposed client-side and may therefore detect that the user has attempted to upload the item of media content by performing local client-side monitoring or scanning operations. For example, detection module 104 may operate client-side to monitor for attempts by the user to input an item of media content into one or more applications that may further be configured for uploading items of media content into a network or repository online. Accordingly, prior to the user finalizing the uploading of an item of media content online, detection module 104 may effectively intercept this attempt and detect that the user is attempting to upload the item of media content, such that it may be beneficial to first check whether the item of media content may potentially compromise the user's privacy in accordance with method 300, as discussed in more detail below.

Additionally, or alternatively, detection module 104 may optionally be disposed server-side. For example, detection module 104 may disposed within server 206 of FIG. 2 and may operate in connection with security service 250. Server 206 may correspond to an intermediary proxy server that performs at least a portion of method 300 as a proxy service for traffic originally directed to one or more final target destinations on the Internet. Additionally, or alternatively, server 206 may correspond to an online social network server, social media server, and/or other online server to which the user is attempting to upload the item of media content. Accordingly, in these examples, server 206 may, in addition to receiving the item of media content, also optionally perform at least a portion of method 300 to provide the beneficial service of checking, for the user, whether the item of media content may potentially compromise the user's privacy in accordance with method 300.

As used herein, the term "media content" generally refers to any media content or consumable content that is directed for direct human consumption, such as through reading text, listening to audio/music/vocals, and/or watching video, etc. In some examples, the item of media content may correspond to an item of social media content, such as a post, comment, status update, shareable item, microblogging entry, and/or item of audio and/or visual content shared with one or more other users within an online social network environment. The term media content may therefore refer to content distinct from other content that is directed primarily to consumption for nonhuman entities, such as computer executable code. Generally speaking, media content, such as text, music, images, video, etc., may correspond to a greater threat vector, in terms of exposing one or more instances of personally identifiable information, or privacy-compromising information, and may therefore be the focus of method 300.

At step 304, one or more of the systems described herein may determine, in connection with the privacy-protecting security application, that the item of media content matches a true identity signature for the user that the privacy-protecting security application generated based on other items of media content relating to the user. For example, determination module 106 may, as part of privacy-protecting security application 260, determine that item of media content 122 matches true identity signature 124 for the user 270 that privacy-protecting security application 260 generated based on other items of media content relating to the user 270.

As used herein, the term "true identity signature" generally refers to any attribute or characteristic that, when identified (e.g., at step 304), thereby indicates that a corresponding item of media content creates a risk of exposing personally identifiable information of the user, or otherwise creates a risk of exposing one or more aspects of the user's true identity, such as the true sound of the user's voice and/or a true resemblance or image of the user's actual face, as distinct from a vocal cue or facial image cue associated with an anonymizing persona. In other words, the term "true identity signature" generally refers to any attribute or characteristic that, when present, indicates that the user may be inadvertently revealing one or more aspects of the person's true identity, as distinct from an anonymizing persona that the user may use to help protect the user's privacy online. Illustrative examples of true identity signatures may include classic examples of personally identifiable information, including the name, telephone number, address, Social Security number, credit card number, date of birth, etc., as well as examples of the user's vocal style, writing style, physical appearance, etc.

Determination module 106 may perform step 304 in a variety of ways. In general, determination module 106 may determine that the item of media content matches the true identity signature at least in part by scanning or analyzing the item of media content to detect whether any part of the item of media content triggers a match with the true identity signature. In some examples, determination module 106 may reference multiple different true identity signatures, including a multitude of different true identity signatures relating to instances of personally identifiable information, such as those listed above, as well as more complex items of privacy-compromising or anonymity-compromising information, such as the user's vocal style, speaking style, language style, writing style, mannerism style, gesture style, fashion style, physical appearance, the presence of one or more uniquely identifying physical attributes (e.g., birthmarks or tattoos), etc. Accordingly, in these examples determination module 106 may reference a long list of dozens of true identity signatures, such as those listed above, and check the presence of any one or more of these, or all of these, within a single item of media content that the user is attempting to upload. By checking whether the item of media content creates a risk of exposing any single one of these two identity signatures, determination module 106 may thereby help the user to avoid compromising the user's anonymity or otherwise, exposing the user's privacy.

Furthermore, in at least some examples, the privacy-protecting security application generates the true identity signature based on information that the user uploaded to an identity theft protection service. Accordingly, in some examples, determination module 106 within the privacy-protecting security application may increase a convenience-factor for the user by re-leveraging or repurposing one or more items of information, which were previously input by the user or another user for one primary purpose (e.g., sharing an image or audio content for recreation within an online social network environment, or establishing a fundamental and true identity within an identity-theft protection service), such that the items of information are reused for a second and distinct purpose, which in this case corresponds to preventing exposure of one or more aspects of the person's true identity when uploading items of content online. In view of the above, determination module 106 may intelligently and dynamically scan different repositories, archives, and/or histories of previously uploaded or stored items of content, and thereby further extract one or more aspects of the user's true identity from these items of content, thereby conveniently and autonomously constructing corresponding true identity signatures, as further discussed above in connection with step 304.

As one specific example, the user may have previously input multiple items of information regarding the user's true identity to the identity theft prevention service, such as LIFELOCK. The primary purpose of the identity theft prevention service may be to scan one or more online networks, including networks on the dark web, to check for any improper use of the user's true identity, thereby indicating a potential instance of criminal identity theft. Nevertheless, to further increase the convenience factor for the user, determination module 106 may, as part of privacy-protecting security application 260, further generate one or more true identity signatures, as discussed above, and furthermore apply one or more of these true identity signatures at step 304 to thereby leverage these items of information for a second and distinct purpose, which is the user-friendly prevention of inadvertent or unintended exposure of the user's true identity. Similarly, determination module 106 may generate one or more true identity signatures based on pictures, images, audio clips, video clips, social media posts, microblogging posts, social media comments, etc., which were posted by the user himself or herself, or posted by others within an online social network environment, because any one or more of these may include information about the user's true identity (e.g., images may reveal a facial profile for how the user actually looks, and audio clips may reveal a vocal profile for how the user's voice actually sounds). Accordingly, in these examples, determination module 106 may increase the convenience factor for the user by re-leveraging, and/or repurposing, these items of information regarding the user's true identity, thereby eliminating any need for the user to proceed through a tedious manual process of entering these items of information to benefit from the performance of method 300, as discussed further below.

At step 306, one or more of the systems described herein may prompt, in connection with the privacy-protecting security application and in response to determining that the item of media content matches the true identity signature, the user to perform a privacy-protecting security action to prevent exposing a true identity for the user. For example, prompting module 108 may, as part of privacy-protecting security application 260 and in response to determining that item of media content 122 matches the true identity signature 124, prompt user 270 to perform a privacy-protecting security action to prevent exposing a true identity for user 270.

Prompting module 108 may perform step 306 in a variety of ways. In some examples, prompting module 108 may prompt the user to perform the privacy-protecting security action by alerting the user to a geolocation tagging component that poses a risk of exposing the true identity for the user. More specifically, in some examples, an online social network environment may include a tacit geolocation tagging component that automatically and/or invisibly tags one or more instances of uploaded media content with the geolocation tag, thereby potentially compromising information regarding the user's actual geolocation within the real world. In some examples, the geolocation tagging component may operate in a subtle, inconspicuous, automatic, and/or invisible mode, such that the user may not necessarily be aware that the geolocation tagging component is operating, or it may be difficult for the user to become aware of this fact. Accordingly, in these examples, prompting module 108 may optionally issue an alert to the user regarding the operation of the geolocation tagging component, thereby enabling the user to perform one or more remedial actions, including discarding the attempted uploading of the item of media content, and thereby further preserving the privacy or anonymity of the user in connection with the user's geolocation.

Generally speaking, prompting module 108 may prompt the user to perform the privacy-protecting security action by prompting the user to perform at least one of removing a portion of the item of media content corresponding to the true identity for the user and/or anonymizing the portion of the item of media content corresponding to the true identity for the user. For example, in some scenarios an item of media content, such as an image, audio clip, and/or video, may only contain a small portion of content regarding the user's true identity. In particular, a large image may only contain a small subset that shows part of the user's true physical appearance. Similarly, a lengthy audio clip may only contain a small subset that reveals a vocal signature for how the user's voice actually sounds in the real world. Accordingly, in examples such as these, prompting module 108 may prompt the user to remove one or more of these subsets of media content to address a risk of compromising the user's identity of privacy.

Additionally, or alternatively, prompting module 108 may also optionally prompt the user with a potential remedial action of replacing or substituting the small subsets of media content with replacement subsets, where the replacement subsets do not compromise the user's privacy in the same way. For example, the replacement subsets may distort the information that would otherwise potentially compromise the user's privacy or anonymity. In particular, a subset of an image may be blurred and/or a subset of an audio clip may be distorted or diminished in volume. In further examples, one or more instances of personally identifiable information, such as a name, phone number, Social Security number, address, credit card number, etc., may be partially or entirely replaced with an anonymized values and/or privacy-protecting persona values, thereby further helping the user to protect privacy and/or anonymity. As one specific example, the item of media content may include a telephone number, and prompting module 108 may prompt the user to perform the privacy-protecting security action at least in part by prompting the user to substitute the telephone number with an anonymized telephone number.

More generally speaking, prompting module 108 may optionally tailor the specific remedial action for modifying the item of media content to the nature, formatting, and/or file format of the media content. Accordingly, the proposed remedial action for addressing an item of image content that may potentially compromise the user's privacy may be specifically tailored to a format of image content (e.g., visual blurring or clipping), whereas the specific remedial action for addressing an audio clip that may potentially compromise the user's privacy may be specifically tailored to a format for audio content (e.g., audio distortion, audio noise supplementation, audio quieting, and/or audio silencing).

Figure 4:
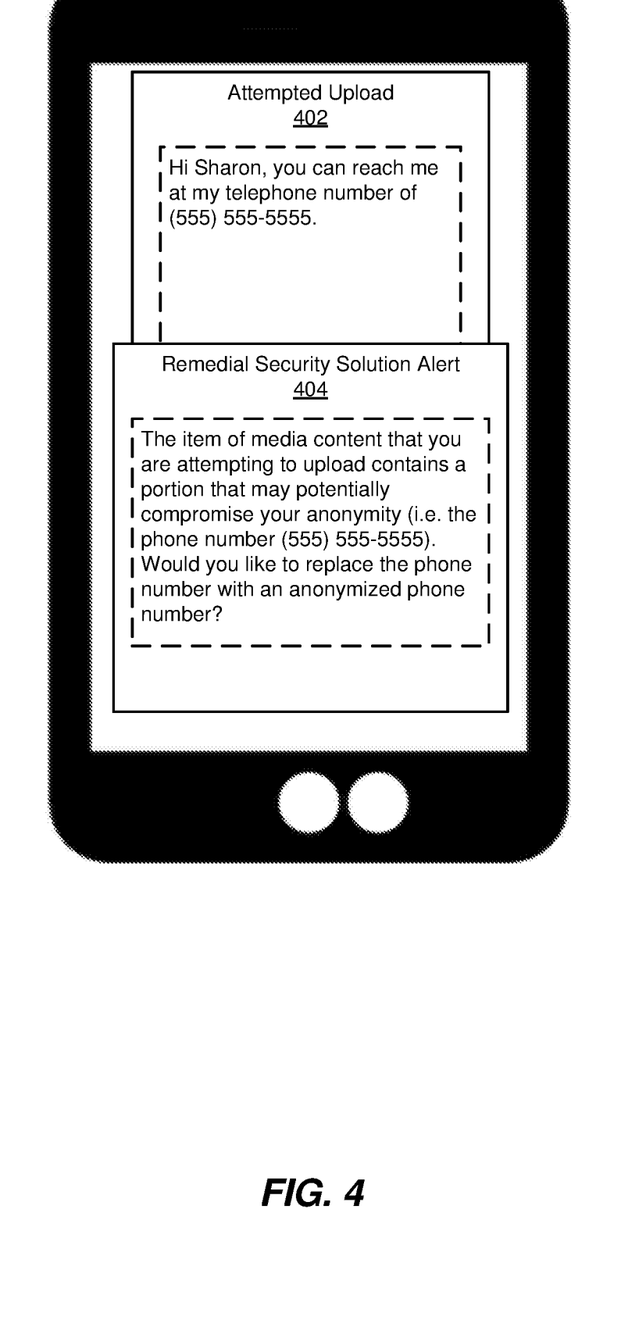
FIG. 4 is a block diagram of an example graphical user interface.

FIG. 4 shows an illustrative example of a graphical user interface relating to the disclosed subject matter. As further shown in this figure, a smart phone display may include an attempted upload 402. Attempted upload 402 may correspond to an item of media content that the user is in the process of attempting to upload online, without yet having finalized or completed the uploading procedure. As further shown in FIG. 4, attempted upload 402 may include an item of textual content, such as an attempted post to a microblogging platform or an attempted post to an online social network environment. In this particular example, attempted upload 402 may also include at least a portion of textual content that creates a risk of exposing at least part of the user's true identity. To be specific, attempted upload 402 includes the user's real-world telephone number. Accordingly, FIG. 4 also shows how method 300 may operate to further display a remedial security solution alert 404, which may further notify the user regarding the risk created by attempted upload 402. Display of remedial security solution alert 404 may be performed by prompting module 108 in accordance with step 306 of method 300, as further discussed above. Additionally, to further assist the user by protecting the user's privacy and/or anonymity, remedial security solution alert 404 may also prompt the user to substitute the real-world telephone number from attempted upload 402 with a substituted and anonymized telephone number, thereby helping to maintain the integrity of the user's privacy and anonymity, as further discussed above.

The above discussion provides a generalized overview of the disclosed subject matter in connection with the example embodiment of method 300 shown in FIG. 3. Additionally, or alternatively, the following discussion provides a supplemental overview of more detailed and concrete example embodiments of the disclosed subject matter. In the discussion below, any suitable one or more of modules 102 may perform corresponding steps or actions, as appropriate in view of the previous discussion of FIGS. 2-3.

Generally speaking, the disclosed subject matter may include systems and methods that enable users to obfuscate personal information in an anonymized environment. The disclosed subject matter may address problems that can arise whereby users can easily disclose, accidentally or in an unintended manner, their true real-world identities when using private/anonymous services, such as a privacy manager. As one illustrative example, simply uploading a photo or a real telephone number onto an online social network environment may potentially reveal the corresponding true identity within the real world.

To address the problems outlined above, the disclosed subject matter may, within an anonymized environment (e.g., an environment where the user is adopting one or more privacy-protecting fictional personas, or where the user is otherwise concealing the user's true real-world identity), monitor for user uploads and scan them, or check them, for personal information. In the case that this checking process produces a positive result, thereby indicating that the item of media content that the user is attempting to upload does include one or more instances of personal information, then the user may be warned prior to the uploading procedure being completed or finalized.

Before proceeding into a detailed discussion of concrete embodiments regarding how the disclosed subject matter actually operates, it is helpful to provide a brief overview of the background technological context within which the disclosed subject matter may potentially operate. For example, in some scenarios the disclosed subject matter may operate in the context of a privacy-protecting security application such as NORTON PRIVACY SOLUTION/MANAGER.

Within this technological background, users may potentially use anonymized identities. These may optionally include collections of email addresses, phone numbers, addresses, passwords, private browsing behavior settings, and/or privacy settings. Each of these identities can optionally be used to either facilitate a specific activity in the real world or a specific activity online. For example, the user may potentially adopt an anonymous persona in order to engage in online dating and/or to engage in online shopping. In these examples, the disclosed subject matter may optionally define one or more sets of privacy settings, which in these privacy settings may be defined based on the activity of the anonymized identity. In other words, depending on how the user behaves online when adopting a specific anonymized identity, the disclosed subject matter may intelligently adjust or recalibrate privacy settings to match or correspond to the specific behaviors.

As a second illustrative example of a background technological context, users may sometimes seek to protect their privacy at least in part by leveraging a privacy vault. A privacy vault may allow only the end user to see his or her data. In some examples, a vendor providing the privacy vault, such as SYMANTEC, may not even possess a capability to view into this user data. Instead, the vendor may only possess a capability to store encrypted blobs or chunks of information, without possessing any corresponding decryption capabilities. Illustrative examples of user information that the user may desire to keep within such a privacy vault may include passwords, credit card numbers, emails, messages, etc.

As a third illustrative example of a background technological context, users may desire to leverage anonymized phone numbers to protect their own privacy. Anonymized phone numbers may include phone numbers that are tied to a privacy-protecting persona as distinct from the user's true identity, as further discussed above.

As a fourth illustrative example of a background technological context, users may also seek to protect their own privacy by leveraging the technology of anonymized or private browsing sessions. Private browsing sessions may be tied to anonymized identifiers.

As a fifth illustrative example of a background technological context, users may also seek to protect the privacy by leveraging the technology of anonymized emails and messages. Some technologies may provide end-to-end encrypted email and messages, which may further be tied to the anonymized identifiers that are further discussed above.

Within one or more of the background technological contexts that are listed above, users may interact with the devices in a number of ways that may potentially compromise the privacy and/or anonymity. For example, users may potentially seek to upload personal information to one or more online destinations, including online social networking environments. In particular, users may seek to share photos, videos of friends and family, real-world telephone numbers, real-world email addresses, real-world physical addresses, a Social Security number, a date of birth, and/or a sample audio clip of the user speaking, any one or more of which may potentially compromise the user's privacy or anonymity, especially within the context of an anonymized online environment where the user seeks to remain anonymous. Similarly, users also interact with the devices through touch points, which may include browser upload functionality for uploading items of media content to online social networking environments or any other target website, text input boxes, and/or email viewers, etc.

To address the potential privacy concerns outlined above, the disclosed subject matter may operate within two stages. Generally speaking, the user may be active within an anonymized environment, such as an environment where the user is adopting or referencing an anonymized identifier). The specific anonymized identifier that the user is referencing may also be tied to specific settings that defined policies for when it is acceptable, or not, to reveal instances of personal information.

In view of the above, the disclosed subject matter may first optionally operate through a discovery phase or discovery stage. During this optional and preliminary stage, a privacy-protecting security application can discover who a user frequently targets for taking photos or videos. Similarly, the disclosed subject matter may determine a real-world phone number and/or a real-world email address, such as by referencing a profile within an identity theft prevention service and/or referencing third-party security vendor personal profile account details. In some examples, the disclosed subject matter may extract these items of information in the discovery phase by scanning one or more areas of a client device corresponding to the user, such as a smartphone or a personal/business laptop (e.g., searching for local media, such as audio, video, or photographs, of the user on the client device). Based on one or more combinations of the above items of information, the disclosed subject matter may optionally build or generate metadata and/or classifiers, thereby creating a real-world signature that may be used to identify matches corresponding to the user's true identity. The real-world signature for the user may be synchronized with a privacy vault, as further discussed above. The synchronization process may enable the user to reuse one or more of the classifiers discussed above, from one platform to another platform, without requiring or initiating performance of an additional rediscovery process.

Secondly, the disclosed subject matter may include a subsequent optional "notification and obfuscation" phase or stage. During the second stage, when the user uploads one or more items of media content, the disclosed subject matter may analyze the content, and check it against one or more signatures, as discussed above. Whenever the disclosed subject matter detects a match in response to performing this checking procedure, the disclosed subject matter may also optionally alert or notify the user, thereby enabling the user to perform one or more remedial actions, as discussed further above in connection with step 306 of method 300.

Additionally, or alternatively, the disclosed subject matter may also supplement the above procedures with a geolocation tagging notification feature, whereby the user is beneficially notified whenever an online resource or website, etc., attempts to tag an item of media content with geolocation information that may potentially compromise the user's privacy or anonymity. More specifically, the disclosed subject matter may optionally warn a user regarding the potential for a geolocation tagging process to occur when the user initiates an upload of one or more items of content. Furthermore, the disclosed subject matter may also potentially prompt the user to remove at least a portion of the item of media content that creates the risk of exposing at least part of the user's true identity. Additionally, or alternatively, the disclosed subject matter may prompt the user to replace, substitute, and/or anonymize the item of media content. In the example of videos and photographs, the disclosed subject matter may potentially blur one or more instances of human faces. In the example of vocal content, the disclosed subject matter may potentially add noise to distort the vocal content and obscure a vocal style of the user. Similarly, the disclosed subject matter may prompt the user to replace an actual real-world telephone number with an anonymized telephone number, as further discussed above.

Figure 5:
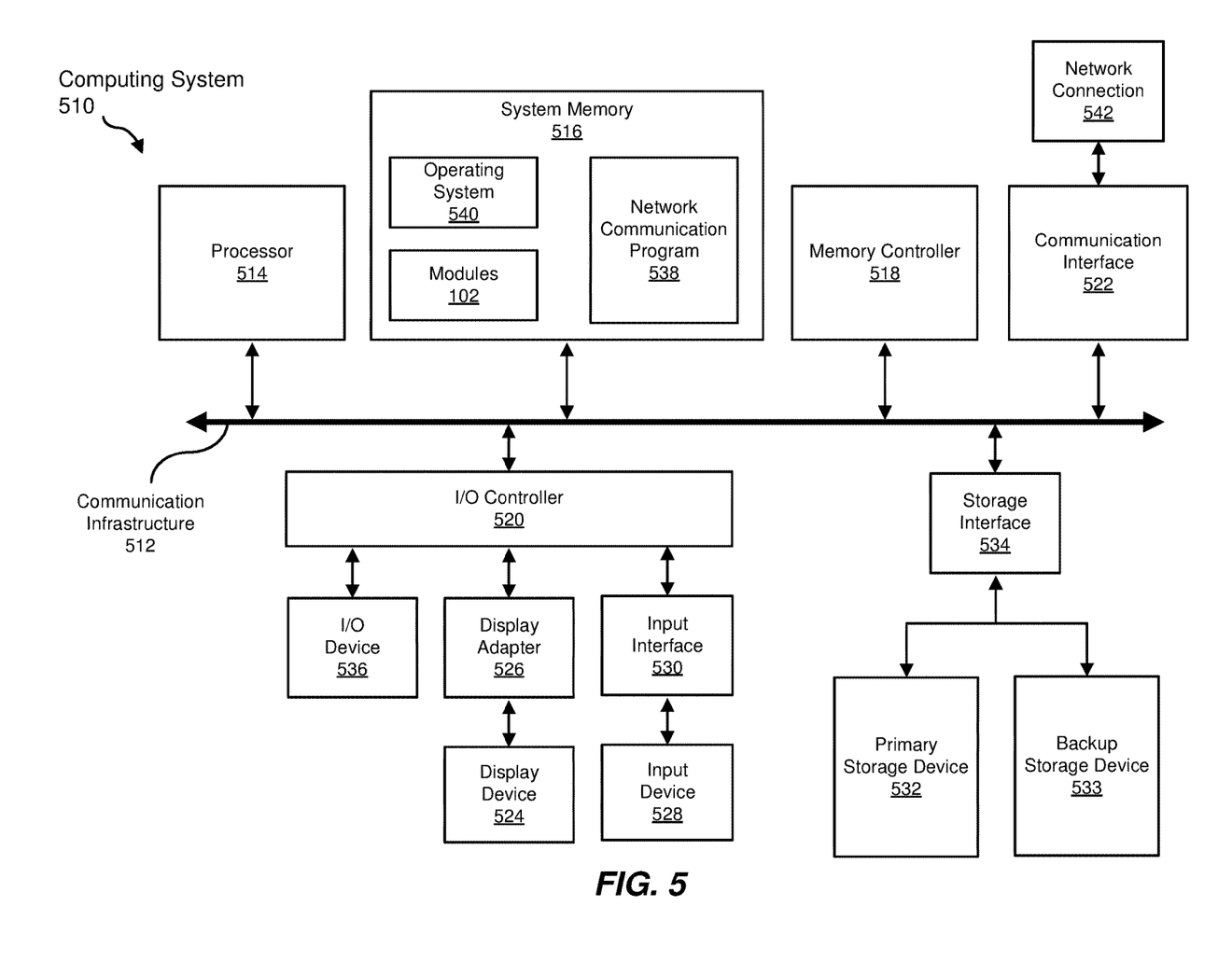
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
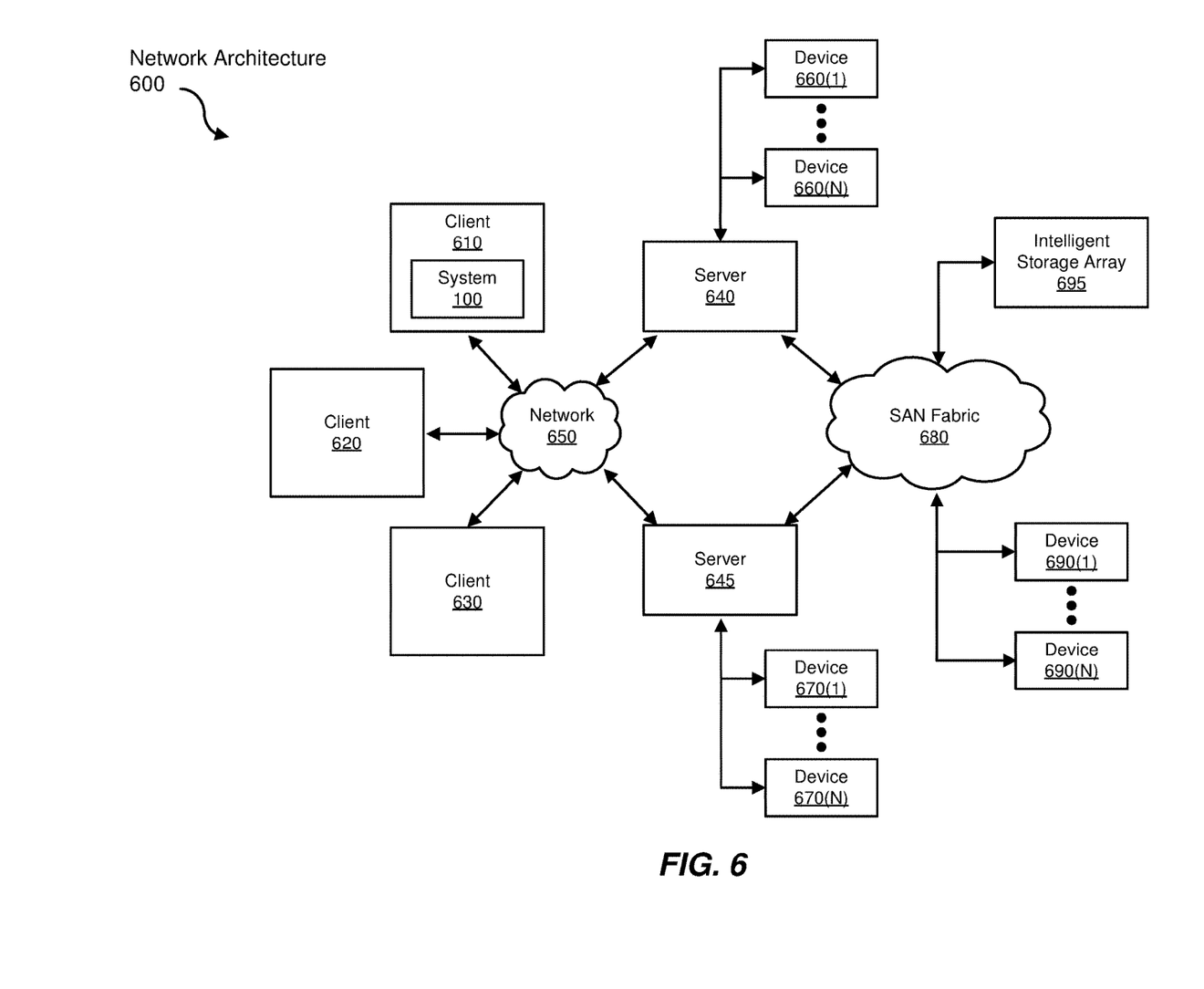
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(i)-(N) may be directly attached to server 645. Storage devices 660(i)-(N) and storage devices 670(i)-(N) generally represent any type or form of storage device or medium capable of storing data and/or other computer-readable instructions. In certain embodiments, storage devices 660(i)-(N) and storage devices 670(i)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(i)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(i)-(N) and array 695 appear as locally attached devices to client systems 610, 620, and 630. As with storage devices 660(1)-(N) and storage devices 670(i)-(N), storage devices 690(i)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(i)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(i)-(N), storage devices 670(i)-(N), storage devices 690(i)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for protecting users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users, at least a portion of the method being performed by a computing device comprising at least one processor, the method comprising:
    generating a true identity signature for a user of a privacy-protecting security application based on items of media content relating to the user;
    identifying an anonymized identity for the user, the anonymized identity comprising anonymized versions of personally identifying information associated with the true identity signature of the user;
    detecting, by the privacy-protecting security application, an attempt by the user to upload an item of media content;
    in response to detecting the attempt, intercepting, prior to the user finalizing the upload of the item of media content, the attempt by the user to upload the item of media content;
    determining, by the privacy-protecting security application and in response to detecting the attempt by the user, that the item of media content matches the true identity signature for the user; and
    generating an anonymized version of the item of media content by replacing, by the privacy-protecting security application in response to determining that the item of media content matches the true identity signature and prior to the upload being completed, at least a portion of the item of media content that corresponds to the true identity signature of the user with an anonymized version of the portion of the item of media that corresponds to the anonymized identity for the user; and
    uploading the anonymized version of the item of media content instead of the item of media content.

2. The computer-implemented method of claim 1, wherein the item of media content comprises an item of social media content.

3. The computer-implemented method of claim 1, wherein the item of media content comprises at least one of:
   text content;
   image content;
   audio content; or
   video content.

4. The computer-implemented method of claim 1, further comprising alerting the user to a geolocation tagging component that poses a risk of exposing the true identity for the user.

5. The computer-implemented method of claim 1, further comprising prompting the user to perform at least one of:
   removing a portion of the item of media content corresponding to the true identity for the user; or
   anonymizing the portion of the item of media content corresponding to the true identity for the user.

6. The computer-implemented method of claim 1, wherein:
   the item of media content comprises image content; and
   generating the anonymized version of the item of media content comprises blurring a portion of the image content.

7. The computer-implemented method of claim 1, wherein:
   the item of media content comprises vocal content; and
   generating the anonymized version of the item of media content comprises adding noise to a portion of the vocal content.

8. The computer-implemented method of claim 1, wherein:
   the item of media content comprises a telephone number; and
   generating the anonymized version of the item of media content comprises substituting the telephone number with an anonymized telephone number.

9. The computer-implemented method of claim 1, wherein the privacy-protecting security application generates the true identity signature based on information that the user uploaded to an identity theft protection service.

10. The computer-implemented method of claim 1, wherein the true identity signature for the user enables the privacy-protecting security application to detect a match for at least one of:
    an image of the user;
    a voice of the user;
    a writing style of the user; or
    personally identifiable information of the user.

11. A system for protecting users, the system comprising:
    at least one hardware processor; and
    a memory comprising computer-executable instructions that, when executed by the hardware processor, cause the hardware processor to:
      generate a true identity signature for a user of a privacy-protecting security application based on items of media content relating to the user;
      identify an anonymized identity for the user, the anonymized identity comprising anonymized versions of personally identifying information associated with the true identity signature of the user;
      detect, by the privacy-protecting security application, an attempt by the user to upload an item of media content;
      in response to detecting the attempt, intercept, prior to the user finalizing the upload of the item of media content, the attempt by the user to upload the item of media content;
      determine, by the privacy-protecting security application and in response to detecting the attempt by the user, that the item of media content matches the true identity signature for the user; and
      generate an anonymized version of the item of media content by replacing, by the privacy-protecting security application in response to determining that the item of media content matches the true identity signature and prior to the upload being completed, at least a portion of the item of media content that corresponds to the true identity signature of the user with an anonymized version of the portion of the item of media that corresponds to the anonymized identity for the user; and
      upload the anonymized version of the item of media content instead of the item of media content.

12. The system of claim 11, wherein the item of media content comprises an item of social media content.

13. The system of claim 11, wherein the item of media content comprises at least one of:
    text content;
    image content;
    audio content; or
    video content.

14. The system of claim 11, further comprising alerting the user to a geolocation tagging component that poses a risk of exposing the true identity for the user.

15. The system of claim 11, further comprising prompting the user to perform at least one of:
    removing a portion of the item of media content corresponding to the true identity for the user; or
    anonymizing the portion of the item of media content corresponding to the true identity for the user.

16. The system of claim 11, wherein:
    the item of media content comprises image content; and
    generating the anonymized version of the item of media content comprises a portion of the image content.

17. The system of claim 11, wherein:
    the item of media content comprises vocal content; and
    generating the anonymized version of the item of media content comprises adding noise to a portion of the vocal content.

18. The system of claim 11, wherein:
    the item of media content comprises a telephone number; and
    generating the anonymized version of the item of media content comprises substituting the telephone number with an anonymized telephone number.

19. The system of claim 11, wherein the privacy-protecting security application generates the true identity signature based on information that the user uploaded to an identity theft protection service.

20. A non-transitory computer-readable medium comprising one or more computer-readable instructions that, when executed by at least one processor of a computing device, cause the computing device to:
    generate a true identity signature for a user of a privacy-protecting security application based on items of media content relating to the user;
    identify an anonymized identity for the user, the anonymized identity comprising anonymized versions of personally identifying information associated with the true identity signature of the user;
    detect, by the privacy-protecting security application, an attempt by the user to upload an item of media content;

in response to detecting the attempt, intercepting, prior to the user finalizing the upload of the item of media content, the attempt by the user to upload the item of media content;

determine, by the privacy-protecting security application and in response to detecting the attempt by the user, that the item of media content matches the true identity signature for the user; and generate an anonymized version of the item of media content by replacing, by the privacy-protecting security application in response to determining that the item of media content matches the true identity signature and prior to the upload being completed, at least a portion of the item of media content that corresponds to the true identity signature of the user with an anonymized version of the portion of the item of media that corresponds to the anonymized identity for the user; and upload the anonymized version of the item of media content instead of the item of media content.

\* \* \* \* \*